United States Patent

Bonvin

(10) Patent No.: US 8,471,509 B2
(45) Date of Patent: Jun. 25, 2013

(54) MANAGEMENT OF DISK DRIVE DURING POWER LOSS

(75) Inventor: Frederic Bonvin, Longmont, CO (US)

(73) Assignee: STMicroelectronics, Inc., Coppell, TX (US)

( * ) Notice: Subject to any disclaimer, the term of this patent is extended or adjusted under 35 U.S.C. 154(b) by 376 days.

(21) Appl. No.: 12/505,822

(22) Filed: Jul. 20, 2009

(65) Prior Publication Data

US 2010/0165811 A1 Jul. 1, 2010

Related U.S. Application Data

(60) Provisional application No. 61/141,641, filed on Dec. 30, 2008.

(51) Int. Cl.
*H02P 6/08* (2006.01)
(52) U.S. Cl.
USPC .......... 318/400.34; 318/254.1; 318/560; 318/561
(58) Field of Classification Search
USPC ............ 318/400.33, 376, 254.1, 560, 561, 318/268, 49, 599, 652, 400.34; 360/75; 369/53.3
See application file for complete search history.

(56) References Cited

U.S. PATENT DOCUMENTS

| | | | | | |
|---|---|---|---|---|---|
| 4,804,892 | A | * | 2/1989 | Muller | 318/400.17 |
| 5,091,680 | A | * | 2/1992 | Palm | 318/368 |
| RE34,609 | E | * | 5/1994 | Mueller | 318/400.08 |
| 5,504,402 | A | * | 4/1996 | Menegoli | 318/377 |
| 5,508,874 | A | * | 4/1996 | Williams et al. | 361/92 |
| 5,828,245 | A | * | 10/1998 | Brambilla et al. | 327/108 |
| 6,020,695 | A | * | 2/2000 | Kelly et al. | 318/49 |
| 6,140,784 | A | * | 10/2000 | Mazda | 318/280 |
| RE37,589 | E | * | 3/2002 | Mueller | 318/400.26 |
| 6,515,443 | B2 | * | 2/2003 | Kelly et al. | 318/599 |
| 6,566,832 | B2 | * | 5/2003 | Ataee | 318/560 |
| 6,741,066 | B1 | * | 5/2004 | Densham et al. | 320/145 |
| 6,970,319 | B1 | * | 11/2005 | Bennett et al. | 360/75 |
| 6,977,482 | B2 | * | 12/2005 | Popescu-Stanesti et al. | 320/116 |
| 7,005,817 | B2 | * | 2/2006 | Thiesfeld et al. | 318/400.09 |
| 7,054,089 | B2 | * | 5/2006 | Kokami | 360/73.03 |
| 7,068,455 | B2 | * | 6/2006 | Tanner | 360/69 |
| 7,068,460 | B2 | * | 6/2006 | Brenden et al. | 360/75 |
| 7,092,197 | B2 | * | 8/2006 | El-Sherif et al. | 360/75 |
| 7,116,512 | B1 | * | 10/2006 | Rana et al. | 360/75 |
| 7,256,554 | B2 | * | 8/2007 | Lys | 315/291 |
| 7,274,529 | B2 | * | 9/2007 | Ho et al. | 360/75 |
| 7,348,760 | B2 | * | 3/2008 | Bucur et al. | 320/132 |
| 7,358,706 | B2 | * | 4/2008 | Lys | 323/222 |
| 7,385,364 | B1 | * | 6/2008 | Hoo et al. | 318/254.1 |

(Continued)

*Primary Examiner* — Paul Ip

(74) *Attorney, Agent, or Firm* — Graybeal Jackson LLP

(57) ABSTRACT

An embodiment of a circuit for maintaining voltage at a voltage bus after a power loss in a hard disk drive system. HDD systems may suddenly lose power and specific tasks, such as parking the read/write head and storing state data may be accomplished using a power generated from back EMF of a motor that is still turning. During the power loss sequence, a drive controller may drive a power chipset to regulate the voltage at a voltage bus so as to conserve power as much as possible. In this manner, the drive circuit may regulate the voltage via a drive algorithm to be just above a threshold voltage (typically 4.4 V) while the HDD system is storing state data, but apply other algorithm for other situations, such as parking the read/write head. Various drive algorithms may be tailored to provide a specific sequence of voltage bus regulation techniques suited to specific applications.

20 Claims, 4 Drawing Sheets

U.S. PATENT DOCUMENTS

| | | | |
|---|---|---|---|
| 7,420,348 B2 * | 9/2008 | Fukamizu et al. | 318/560 |
| 7,548,392 B1 * | 6/2009 | Desai et al. | 360/75 |
| 7,564,220 B2 * | 7/2009 | Niculae et al. | 320/131 |
| 7,612,521 B2 * | 11/2009 | Miyajima | 318/819 |
| 7,649,330 B2 * | 1/2010 | Yamashita et al. | 318/560 |
| 7,652,459 B2 * | 1/2010 | Abu Qahouq et al. | 323/283 |
| 7,659,673 B2 * | 2/2010 | Lys | 315/247 |
| 7,692,394 B2 * | 4/2010 | Hill et al. | 318/139 |
| 7,773,351 B2 * | 8/2010 | Kanai | 361/23 |
| 7,848,045 B1 * | 12/2010 | Li et al. | 360/75 |
| 7,902,778 B2 * | 3/2011 | Yamashita et al. | 318/400.34 |
| 8,026,706 B2 * | 9/2011 | Abu Qahouq et al. | 323/283 |
| 8,030,861 B2 * | 10/2011 | Hoogzaad | 318/376 |
| 2001/0030880 A1 * | 10/2001 | Miyazaki et al. | 363/98 |
| 2002/0006007 A1 * | 1/2002 | Ataee | 360/73.01 |
| 2002/0017887 A1 * | 2/2002 | Gotou et al. | 318/560 |
| 2002/0053890 A1 * | 5/2002 | Gotou et al. | 318/254 |
| 2002/0060544 A1 * | 5/2002 | Teutsch et al. | 318/599 |
| 2002/0079856 A1 * | 6/2002 | Hill et al. | 318/560 |
| 2003/0117918 A1 * | 6/2003 | Thiesfeld et al. | 369/53.3 |
| 2004/0100722 A1 * | 5/2004 | Kokami | 360/75 |
| 2005/0018339 A1 * | 1/2005 | Tanner | 360/69 |
| 2005/0018340 A1 * | 1/2005 | Tanner | 360/69 |
| 2005/0213352 A1 * | 9/2005 | Lys | 363/17 |
| 2005/0213353 A1 * | 9/2005 | Lys | 363/17 |
| 2005/0218853 A1 * | 10/2005 | Kokami | 318/599 |
| 2005/0218870 A1 * | 10/2005 | Lys | 323/222 |
| 2005/0219872 A1 * | 10/2005 | Lys | 363/21.04 |
| 2005/0248308 A1 * | 11/2005 | Reed et al. | 318/806 |
| 2005/0264921 A1 * | 12/2005 | El-Sherif et al. | 360/78.04 |
| 2006/0007581 A1 * | 1/2006 | Brenden et al. | 360/75 |
| 2006/0072237 A1 * | 4/2006 | Kokami | 360/75 |
| 2006/0208680 A1 * | 9/2006 | Fukamizu et al. | 318/560 |
| 2006/0238160 A1 * | 10/2006 | Fukamizu et al. | 318/652 |
| 2007/0046228 A1 * | 3/2007 | Ogino et al. | 318/268 |
| 2007/0046229 A1 * | 3/2007 | Ogino et al. | 318/268 |
| 2007/0078568 A1 * | 4/2007 | Donaldson et al. | 700/298 |
| 2007/0090766 A1 * | 4/2007 | LaGrave et al. | 315/82 |
| 2007/0188906 A1 * | 8/2007 | Ho et al. | 360/75 |
| 2007/0195451 A1 * | 8/2007 | Kokami | 360/78.04 |
| 2007/0285827 A1 * | 12/2007 | Yamashita et al. | 360/75 |
| 2007/0285828 A1 * | 12/2007 | Yamashita et al. | 360/75 |
| 2008/0203992 A1 * | 8/2008 | Qahouq et al. | 323/299 |
| 2008/0284500 A1 * | 11/2008 | Chigira | 327/538 |
| 2008/0291588 A1 * | 11/2008 | Kanai | 361/23 |
| 2009/0045762 A1 * | 2/2009 | Hayashi et al. | 318/379 |
| 2009/0284193 A1 * | 11/2009 | Hoogzaad | 318/376 |
| 2009/0315490 A1 * | 12/2009 | Hoogzaad | 318/376 |
| 2010/0002331 A1 * | 1/2010 | Tan | 360/75 |
| 2010/0117616 A1 * | 5/2010 | Qahouq et al. | 323/283 |
| 2010/0141191 A1 * | 6/2010 | Chen et al. | 318/400.33 |

* cited by examiner

US 8,471,509 B2

MANAGEMENT OF DISK DRIVE DURING POWER LOSS

PRIORITY CLAIM TO PROVISIONAL PATENT APPLICATION

This patent application claims priority to U.S. Provisional Patent Application No. 61/141,641 entitled 'OPTIMIZED POWER MANAGEMENT DURING POWER LOSS' filed on Dec. 30, 2008 and is hereby incorporated by reference.

BACKGROUND

A computer may use hard-disk drives (HDD) for storing data that is needed for operation of the computer. A typical HDD includes a magnetic read/write head and one or more magnetic disks for storing data. But for clarity, hereinafter a HDD is discussed as including only a single disk. The disk is mounted on a spindle motor, which rotates the disk, thereby allowing the movable read/write head to read data from and to write data to the disk. The spindle motor and read/write head may be controlled by a power chipset.

When the HDD is powered down during a normal power-down sequence (e.g., when an operator properly shuts down the computer), the read/write head is typically moved to a safe location such that the head does not impact or come to rest on the disk. This operation of moving the head to a safe location is called parking the head. If the head is not parked before the HDD supply voltage falls below a certain level, then the head may land on the disk while or after the disk stops spinning, thus potentially damaging the disk and/or the read/write head.

When main power is suddenly lost in an HDD, the controlling power chipset may provide auxiliary power to the HDD for a limited amount of time. For example, the power chipset may convert the inertia of the still-spinning hard disk into electrical energy. This time and the auxiliary power provided by the chipset are typically sufficient for the HDD to safely park the read/write head.

In addition to parking the read/write head, an HDD may attempt to perform other tasks (e.g., write data to the disk) during this sudden power-down time. For example, one may wish to store system-restore information about an incomplete operation of the computer so that during or after the next power up of the computer, this information may be retrieved and the previously incomplete operation may continue. Therefore, as more and more power demands are placed on an HDD after power is lost, the danger increases that not enough auxiliary power will be available for parking the read/write head, and, therefore, that the hard disk itself may be damaged by the read/write head crashing into the disk.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
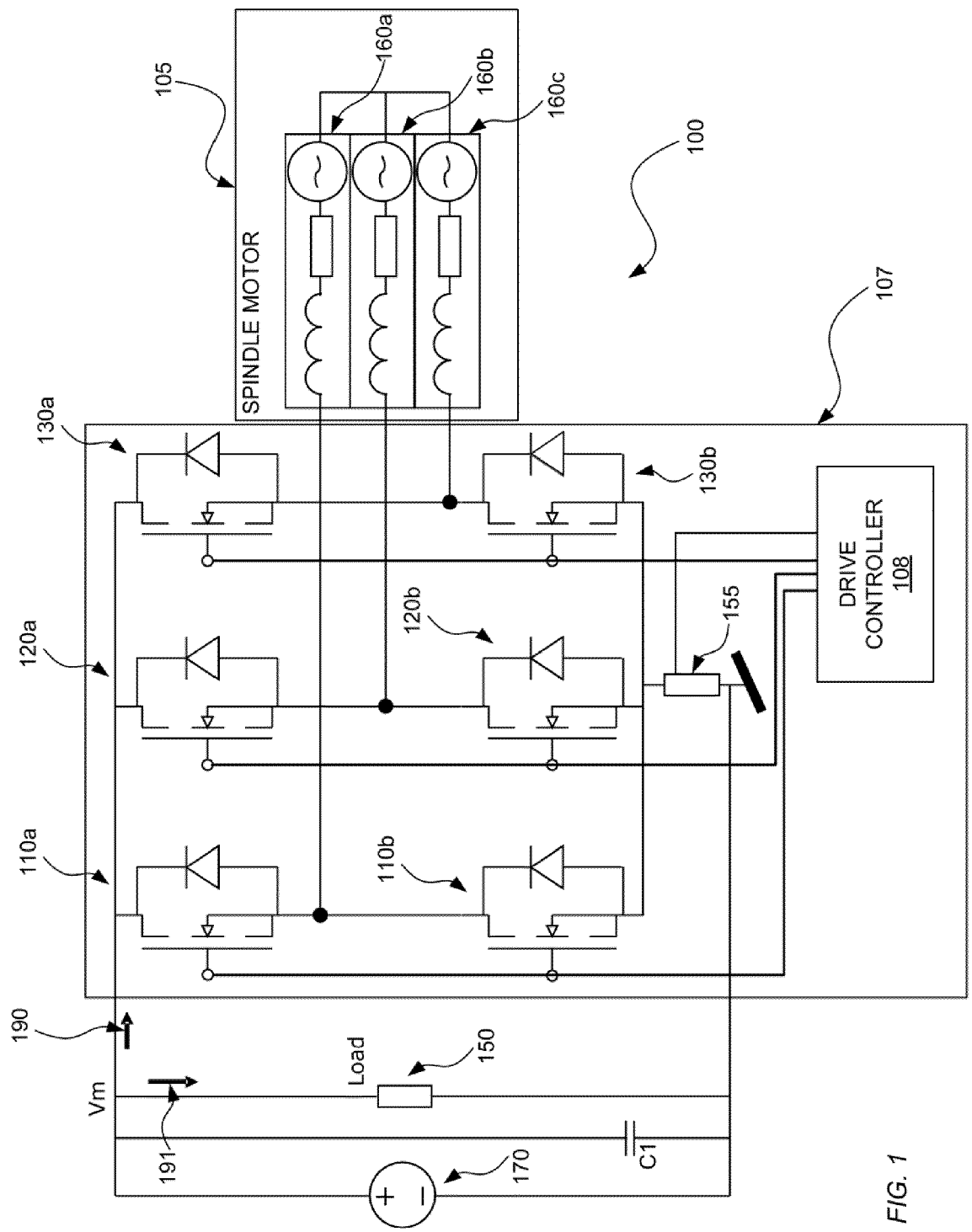
FIG. 1 is a schematic diagram of an embodiment of a HDD system wherein the spindle motor is operating as a motor during normal operation.

FIG. 1 is a schematic diagram of an embodiment of a hard disk drive (HDD) system 100 wherein a spindle motor 105 rotates a spindle to which a magnetic disk is attached, i.e., the motor spins the disk. The spindle motor 105 may be a brushless three-phase direct-current (DC) motor that may be driven synchronously by a controller 108, which may be part of a power chipset 107. Thus, instead of a mechanical commutation system based on brushes typically found in a brushed DC motor, the brushless DC motor 105 is commutated using electronic circuitry. Such circuitry may include MOSFET transistors 110a/b, 120a/b, and 130a/b, which are part of the power chipset 107. The power chip set 107 may be an integrated circuit disposed on a single die, or may be multiple integrated circuits and/or non-integrated circuit components disposed on separate dies or otherwise separately from each other.

These MOSFET transistors compose three sets of bidirectional drivers 110a/b, 120a/b and 130a/b (these MOSFET transistor pairs may also be called half bridges) that drive the phases 160a-c of the spindle motor 105. Each MOSFET transistor 110a/b, 120a/b and 130a/b may be turned on and off at each transistor's respective gate by drive signals. These drive signals may be controlled by a drive controller 108. The drive controller 108 may control the MOSFET transistors 110a/b, 120a/b and 130a/b (by monitoring a current through sense resistor 155 and/or monitoring the VM voltage and monitoring the spindle rotor position with sensorless algorithms) to produce a desired phase voltage, and, therefore, a corresponding motor speed. More advanced controllers 108 may employ a microprocessor to manage the disk's acceleration/deceleration, control the disk's speed, and fine-tune efficiency of delivery of power to actuating the disk.

The speed of the spindle motor 105 depends on the voltages applied at its phases. By varying the average voltage across the phases, the revolutions per minute (RPM) of the spindle motor 105 can be altered. This is achieved by altering the duty cycle of each phase's pair of MOSFET transistors. Thus, each phase 160a-c may receive coordinated pulse-width modulated (PWM) signals having a complex duty cycle at the gates of their respective MOSFET bridge that are suited to produce a specific motor speed. Typically, the higher the duty cycle, the higher the speed. Thus, the MOSFETs 110*a/b*, 120*a/b* and 130*a/b* may be switched on and off at a specific rate to produce a desired duty cycle, which, in turn, drives the motor 105 at a desired speed.

In operation, a power supply 170 provides a voltage to a voltage bus Vm. This voltage may be, for example, 12V for HDD systems in desktop computers and may be 5V is HDD systems in laptop computers. This voltage not only provides power to drive the spindle motor 105 (as shown by current flow arrow 190) as described above, but also provides power (as shown by current flow arrow 191) to the other portions of the HDD as represented by the load 150. A decoupling capacitor C1 is also coupled to the voltage bus Vm and provides a means for filtering any voltage ripple or noise on Vm. The load 150 may include read/write channel circuitry, read/write head actuation devices, and the like. These components are not shown separately, but are instead collectively represented as the load 150.

Although described as a HDD system 100 herein, the methods and applications discussed herein are applicable to any device having a motor for actuating a spinning device. For example, a DVD drive, a CD drive and other similar devices may also employ the methods and techniques discussed herein.

When a computer system which has an HDD is powered down, a power-loss sequence may be employed to ensure that the read/write head in an HDD system is stored properly (i.e., away from the disk) and that all read/write operations currently being executed are completed. At times, power may be unexpectedly lost from the voltage supply 170 due to a computer being suddenly unplugged or a battery being disconnected without the computer first performing a proper power-loss sequence. When power is lost, the spindle motor 105 and spindle remain spinning based on the inertia of the disk, which was spinning at the time of the power loss. When this occurs, the turning of the spindle generates a voltage across the spindle motor 105 windings respective called back electromotive forces (back EMFs) that may be harnessed to generate a voltage on the voltage bus Vm. That is, the spindle motor 105 now acts as a generator, albeit a weak one. The back EMFs generated may be used to provide power to perform final HDD tasks such as parking the read/write head and storing state information as described below with respect to FIG. 2.

Figure 2:
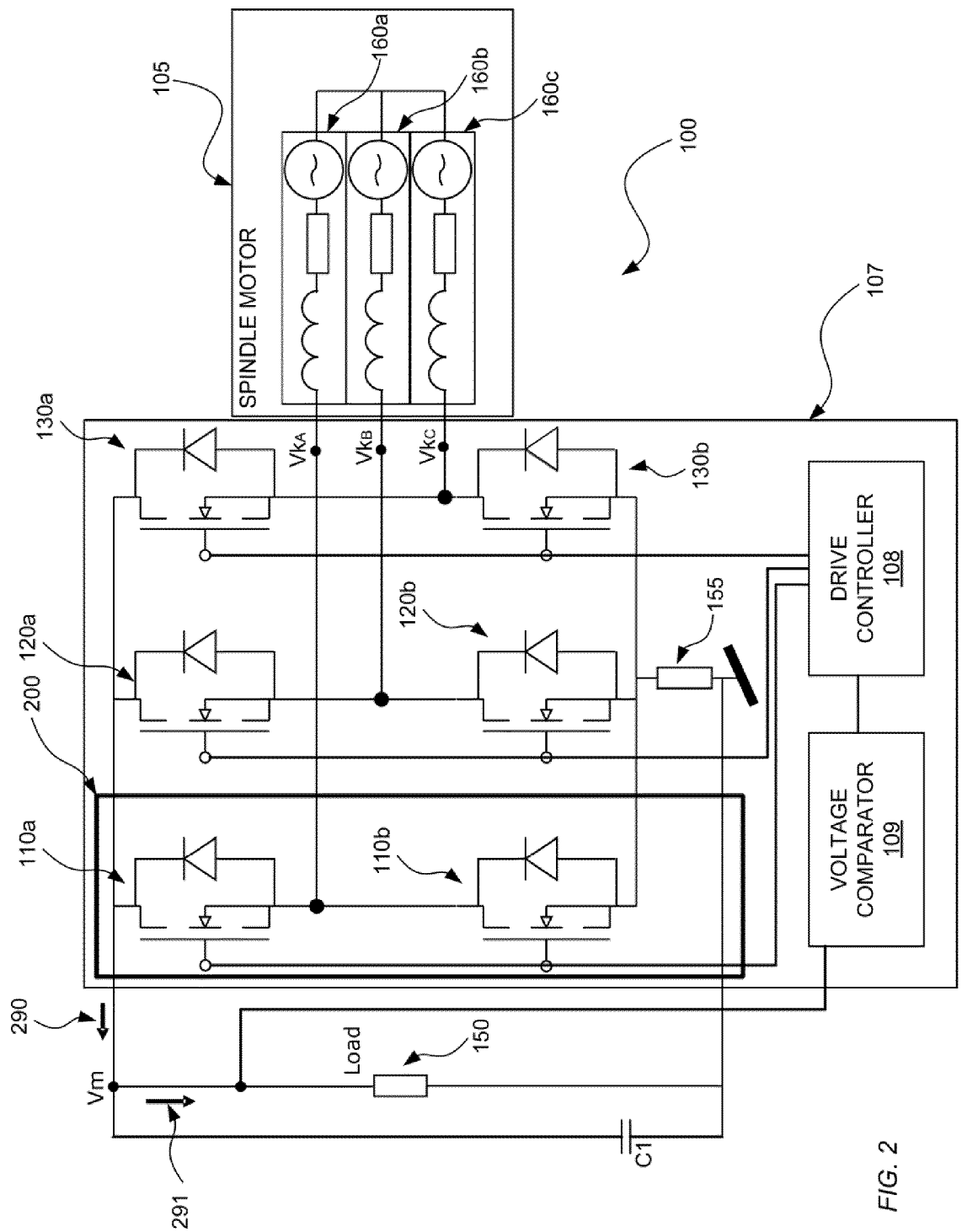
FIG. 2 is a schematic diagram of an embodiment of a HDD system wherein the spindle motor is operating as a generator during a power-loss mode.

FIG. 2 is a schematic diagram of a HDD system 100 wherein the spindle motor 105 is operating as a generator. This may be the case when the HDD system suddenly loses power. As can be seen, there is no voltage being generated by the supply 170 of FIG. 1 (indicated by the omission of the supply 170 from FIG. 2) and, therefore, current flows from the back EMFs generated by the motor 105 to the load 150 in a path as shown by current flow arrows 290 and 291. If no current is drawn from the spindle motor 105 acting as a generator, then the spindle motor 105 will only be slowed down by the forces of friction until coming to rest. However, if and when current is drawn by any load 150, the spindle motor 105 is effectively braked by this current draw, and thus begins to slow down faster as the voltage at the voltage bus Vm falls. Examples of such activities that may draw current include parking a read/write head, read/write operations using flash memory, or any other task that the HDD system may execute or attempt to execute when power is suddenly lost. Therefore, generally speaking, the bigger the load 150, the more current that is drawn, the larger the deceleration of the disk, which results in less time to accomplish the tasks before the voltage bus Vm falls below a minimum voltage threshold for power chip set 107 operation (4.4 V for example).

When acting as a generator, the three-phase motor generates back EMFs on each phase (e.g., each of its three motor windings) that result in voltages Vk at each phase's motor windings. These back EMFs together form three-phase sine-wave voltages having a frequency proportional to the speed in which the spindle motor 105 is still spinning. Absent any other control, these three sine waves may be rectified via the body diodes of the high-side MOSFETs 110*a*, 120*a*, and 130*a* and will generate a complex voltage waveform at the voltage bus Vm that is a succession of each phase-to-phase voltage differential signal minus the voltage drop across the body diodes. However, as discussed below, by controlling the drive signals to the MOSFETs 110*a/b*, 120*a/b* and 130*a/b*, and thereby continuing to drive the spindle motor 105 as if it were still operating normally, one may prolong the amount of time in which the voltage bus Vm remains above the desired threshold.

Thus, one seeks to maximize the amount of time that is available with power supplied to the voltage bus Vm while maintaining at least a minimum threshold voltage on the voltage bus Vm. Typically, at least a few hundred milliseconds are needed to park the read/write head. However, as additional tasks (e.g., memory write tasks, state data dump tasks) are added to a power-loss sequence, a duration of a least one to two seconds may be desirable while still maintaining a threshold voltage on the voltage bus Vm. The drive controller 108 may employ specific drive algorithms (described below) that drive the MOSFETs 110*a/b*, 120*a/b* and 130*a/b* in a specific manner to help prolong a desired voltage on the voltage bus Vm at or above the threshold voltage for as long as possible. These various drive algorithms may employ characteristics of the following three simple techniques.

These three simple techniques for providing power from back EMFs after a sudden power loss are described as: 1) passive rectification 2) synchronous rectification, and 3) spindle chopping. Each of these techniques has advantages and disadvantages as discussed.

In the first technique, passive rectification, when the motor 105 is at top speed (nominal RPM) but then suddenly loses supply power and begins to slow down, it starts to act as a three-phase generator that generates across its windings three respective sine-wave voltage signals that are 120° apart. The peak-to-peak voltage between phases 160*a-c* may typically be about 6.8 V (for a 12.0 V desktop application with a relatively small load 150, for example 30Ω or less). These rectified sine-wave voltage signals may be used to drive the power chipset 107 while it accomplishes the tasks in a power-loss sequence, e.g., finish up write cycles, store information in flash memory, and park the read/write head.

The sine-wave voltage signals are rectified by the inactive MOSFETs 110*a/b*, 120*a/b* and 130*a/b* that drive each channel. More precisely, the sine-wave signal passes through the body diode of each MOSFET. Since there are two of these diodes per channel (high-side and low-side diodes), the signal passes through two diodes of different MOSFET half bridges, and, therefore, the signal experiences an approximate 1.4 V drop (that is, approximately 0.7 V per MOSFET diode) leaving, for example, a complex voltage signal at the voltage bus Vm of about 5.4 V. Of course, this voltage begins to fall because the motor 105 begins to slowdown and the back EMF will be also fall proportionally to the reduced speed of the motor 105. The voltage Vm will also fall as the load 150 increases. This technique may also be called passive rectification because the MOSFETs 110*a/b*, 120*a/b* and 130*a/b* are powered down. That is, no gate voltages are supplied by the drive controller 108 because the power chip set 107 stops generating drive signals to drive the MOSFETs. Thus, an advantage is that no further control or operation is needed, but a drawback is that the voltage drop across the diodes is substantial and the voltage bus begins at 5.4 V and falls off from there.

In a second technique, synchronous rectification utilizes the active drive MOSFETs 110*a/b*, 120*a/b* and 130*a/b* during a power-loss sequence. This embodiment continues operation of the MOSFETs wherein drive signals from the drive controller 108 continue to be generated as if the motor 105 was still operating normally. The benefit here is that the MOSFETs now only have a 0.2 to 0.3 V voltage drop across their respective active channel, and this results in a higher voltage available on the voltage bus Vm. However, the operation of the MOSFETs 110*a/b*, 120*a/b* and 130*a/b* draws a bit more power from the voltage bus Vm as compared to the passive-rectification embodiment. But the synchronous-rectification technique may provide an advantage is having a longer time during which the voltage on the voltage bus Vm is above a threshold voltage as compared to the passive-rectification embodiment. However, the total time in which the voltage bus Vm remains above a threshold voltage is still typically less than one second.

In a third technique called spindle chopping, each of the three phases 160*a-c* of the motor 105 are coupled together during a first drive state as soon as the loss of power is detected. This technique may be used is laptop computer systems that only have a 5 V power supply and therefore allows the generation of a higher voltage at the voltage bus than the previous two techniques. Due to the back EMFs, each current phase builds a current. The technique transitions to a second state wherein the three spindle motor phases are then floated. The current flows back through the diodes of the MOSFETs 110*a/b*, 120*a/b* and 130*a/b* This flyback effect injects the current on VM and maintain a threshold voltage at the voltage bus. In more detail, the Vm capacitor C1 is charged up from the inductance current. The current is not stopped immediately in the inductances, so it will flow through the passive diodes until reaching zero or the system is reset to the first state and the process repeats. Thus, the first state may be described as braking the spindle motor 105 (wherein, the mechanical energy is transformed into current energy in the coil). Likewise, the second state may be described as pushing the current on to the VM capacitor C1, (wherein the current energy is translated into voltage energy). Spindle chopping may be used with laptop computers which have HDD systems that operate at 5.0 V. In a laptop situation, the typical voltage threshold needs to be maintained on the voltage bus Vm at about 2.0 V. Further, in the spindle chopping technique, a voltage doubler may be used to assist with maintaining the proper load voltage higher than the voltage bus Vm. This may be accomplished through a capacitive voltage doubler (not shown), although, efficiency may suffer because additional power is needed to operate the voltage doubler.

Each of the techniques may typically only provide a voltage on the voltage bus Vm above a desired threshold voltage (4.4 volts for example) for less than one second. With the application of embodiments of drive algorithms for driving the MOSFETs 110*a/b*, 120*a/b* and 130*a/b*_as described below, however, this time may be increased, for example, approximately doubled, thereby allowing additional time for the power chip set 107 to accomplish even more power-loss sequence tasks. Thus, embodiments described below may be described as hybrids of some of the simple techniques discussed above.

Such a combination of these techniques may apply drive signals to the MOSFETs 110*a/b*, 120*a/b* and 130*a/b* such that the voltage Vk at the motor windings is controlled so that the voltage on voltage bus Vm is regulated at least at a threshold voltage. As will be explained further below, the delivery of power generated from the back EMFs to the load may be controlled by switching the MOSFETs 110*a/b*, 120*a/b* and 130*a/b* according to specific switching characteristics (i.e., a specific pattern called a drive algorithm). Instead of turning on and off the MOSFETs 110*a/b*, 120*a/b* and 130*a/b* based on the position of the motor rotor only (such as in a synchronous rectification technique), the MOSFETs may be modulated (via PWM signals from the drive controller 108) between each MOSFET pair (e.g., high side and low side) to create, on average, a desired voltage Vk at the phases 160*a-c*. Therefore, the specific drive algorithm used may be tailored to provide a desired voltage Vk at each spindle phase 160*a-c* at desired times during the power-loss sequence. In turn, the voltage at the voltage bus Vm (e.g., a voltage supply node for the load 150) is then monitored to provide feedback control so as to maintain at least a threshold voltage.

Furthermore, the voltage bus Vm is decoupled from the voltage generated by the motor (acting as a generator) through the MOSFETs 110*a/b*, 120*a/b* and 130*a/b*. The MOSFETs 110*a/b*, 120*a/b* and 130*a/b* decouple the voltage bus Vm from a voltage generated by back EMF and are each referred to as a PWM bridge 200 (only the PWM bridge 200 for the first phase is highlighted in FIG. 2). In essence, the spindle motor 105 generates a voltage that sees two loads, an internal load of the motor windings on a primary side of the PWM bridge 200, and a load 150 on the secondary side of the PWM bridge. As a result, specific drive algorithms may be employed for each phase when the spindle motor 105 is acting as a generator. Various drive algorithms may be better understood by looking at each phase as a DC-equivalent model. Before discussing the various drive algorithms, the drive signals in relation to the phase voltages for each phase are discussed in FIGS. 3A and 3B as well as DC-equivalent models in FIGS. 4 and 5.

Figure 3A:
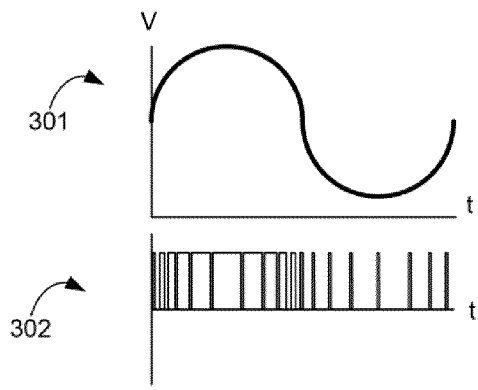
FIG. 3A is a timing diagram showing a higher modulated PWM drive signal that, when filtered by the inductance of the spindle phase, will produce a desired phase voltage.

FIG. 3A is a timing diagram showing a higher modulated PWM drive signal that, when filtered by the inductance of the spindle phase, will produce a desired phase voltage Vk. In this timing diagram, only one phase is shown for ease of illustration and may be associated with the high-side MOSFET 110*a* of the first phase 160*a* of FIG. 2. (The low-side MOSFET 110*b* is driven by the inverted modulation signal). The sine wave 301 may correspond to a pseudo-continuous voltage signal generated by the PWM drive signal 302 that drives the PWM bridge 200 (FIG. 2) for this phase 160*a*. The PWM drive signal 302 is shown below the sine wave 301. The corresponding PWM drive signal 302 shows a series of pulses that are relatively wide in pulse length during the higher amplitude portion of the period of the sine wave 301 and relatively narrow in width during the lower amplitude portion of the sine wave. Each pulse has an amplitude equal to the voltage on the voltage bus Vm; it represents the instantaneous phase voltage Vk. Thus, when this MOSFET is on, current and voltage (i.e., power) generated by the sine wave 301 may be coupled to the voltage bus Vm (FIG. 2) and power may be delivered to the load 150 (FIG. 2).

As can be seen, the pulses of the PWM drive signal 302 are wider initially (e.g., high duty cycle, approaching 90% for example) which results in the amplitude of the voltage signal 301 rising proportionally. Then, as the pulses of the PWM signal become more sparse and narrower (e.g., low duty cycle, approaching 10% for example), the resulting amplitude of the voltage signal 301 falls. The pattern shown across a single period of the sine wave 301 may be repeated for each period wherein the pulses are wider and closer together to drive the amplitude of the voltage signal higher and wherein the pulses are narrower and further apart to allow the voltage signal 301 to lose amplitude.

Generally, speaking, the pulse pattern of FIG. 3A is exaggerated for the purpose of illustration and the frequency of the pulses (for example, 100 kHz) are far greater than the frequency of the voltage sine wave (for example, 500 Hz). Further, the pulse widths are shown as generally wider and further apart for the purpose of illustration. The PWM signal 302 of FIG. 3A is highly modulated as the difference between the highest duty cycle (90% in the first portion) and the lowest duty cycle (10% in the second portion) is large. This highly modulated PWM drive signal 302 results in an injected phase voltage signal 301 that has a greater absolute amplitude (i.e., amplitude from lowest to highest point of the sine wave). A PWM drive signal having lower modulation is shown in FIG. 3B.

Figure 3B:
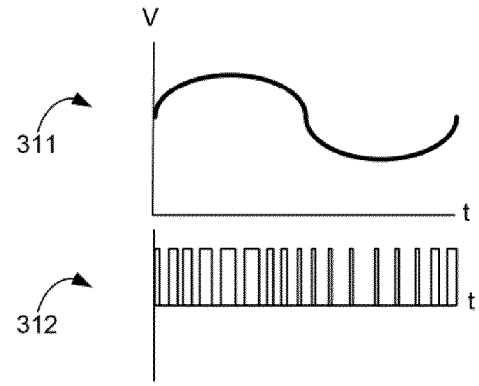
FIG. 3B is a timing diagram showing a lower modulated PWM drive signal that, when filtered by the inductance of the spindle phase, will produce a desired phase voltage.

FIG. 3B is a timing diagram showing a lower modulated PWM drive signal that, when filtered by the inductance of the spindle phase, will produce a desired phase voltage. As can be seen here, the pulses of the PWM drive signal 312 are not as wide as the PWM signal 302 (FIG. 3A). The PWM drive signal 312 still generates the voltage signal 311 that is a sine wave 311 but the absolute amplitude between the highest and lowest points of the sine wave has less magnitude that the voltage signal 301 of FIG. 3A. A comparison between the PWM drive signal 302 and PWM drive signal 312 reveals that the pulses in the first half of the PWM drive signal 312 are narrower than the pulses in the first half of the first PWM drive signal 302. Thus, the resulting voltage signal 311 does not have as much amplitude in its first half. Furthermore, the pulses in the second half of the PWM drive signal 312 are wider than the pulses in the second half of the first PWM drive signal 302. Thus, the resulting voltage signal 311, does not fall as low in its second half. This PWM drive signal 312 may be referred to as a lower modulated signal as the difference between the highest and lowest duty cycle in the PWM signal may be smaller (e.g., 60% as the highest and 40% as the lowest). Again, the pattern shown across a single period of the sine wave 311 may be repeated for each period.

With a PWM drive signal 312 with lower modulation (as compared to the PWM drive signal 302 of FIG. 3A), yields a phase voltage signal 311 that exhibits an amplitude that does not rise and fall as far as the amplitude of the phase voltage signal 301 of FIG. 3A. This less modulated PWM drive signal 302 results in an injected phase voltage signal 301 that has a lower amplitude (i.e., highest point of the sine wave).

The overall PWM drive signals, then, for each phase, may be generated by the drive controller 108 (FIG. 2) with a combination of PWM drive signals ranging from high to low modulation. This combination is called the drive algorithm. When driving the MOSFETs 110a/b, 120a/b and 130a/b according to a desired drive algorithm, each phase's MOSFET bridge 200 may receive a series of pulses that result in a desired amount of power injected to the voltage bus Vm that corresponds to the phase voltages Vk elicited by the PWM drive signals. The nature of this power injection may be better understood by modeling each phase as a DC equivalent as discussed in FIGS. 4 and 5.

Figure 4:
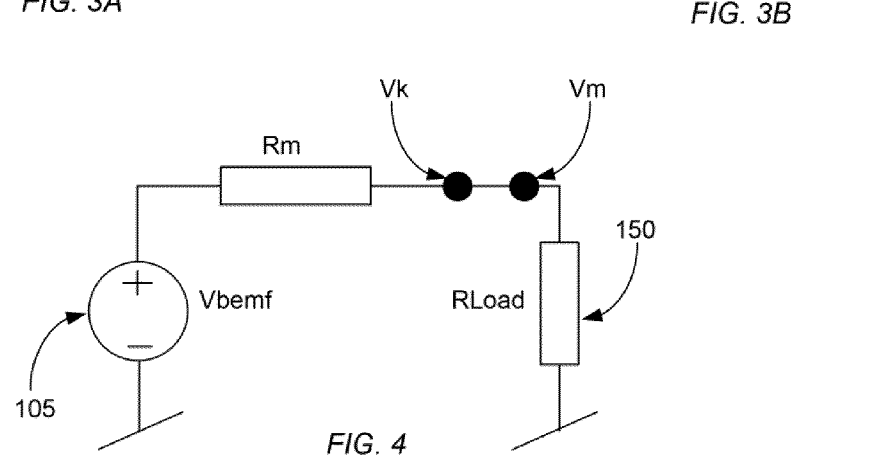
FIG. 4 is schematic diagram of a simplified DC motor equivalent of an embodiment of an HDD system having a spindle motor is operating as a basic electrical generator without output regulation.

FIG. 4 is schematic diagram of a simplified DC motor equivalent of a HDD system when a spindle motor 105 is operating as a generator according to an embodiment of subject matter disclosed herein. The spindle motor 105 is represented as a voltage source Vbemf. The motor generates a back EMF Vbemf that results in a voltage Vk at the motor windings. The motor windings in this simple DC equivalent model may be coupled directly to the voltage bus Vm wherein the load 150 is coupled. (This is only an illustration for the simplified DC equivalent model.) Thus, the voltage generated by Vbemf that may dissipate over two loads. An internal load Rm which is the impedance of the motor windings themselves and the (external) load 150 (FIG. 2) which is the impedance RLoad of all other circuitry (including the power chip set 107 which has the MOSFETs) coupled to the phase of the motor winding.

With this equivalent, the maximum power that may be delivered to the load is when RLoad and Rm are equal to each other. Further, the least amount of power delivered (i.e., most efficient with respect to preserving energy in the windings) will be when RLoad is at a minimum (or infinite impedance with respect to power delivery to the load). Absent any control though (i.e., control via a drive algorithm driving the MOSFETs), the power delivered will rarely deviate as the two loads have relative constant impedance. That is, the motor winding impedance will remain the same and the load impedance will change only slightly depending on the functions and tasks being accomplished during the power-loss sequence. However, by introducing a drive algorithm that switches the MOSFETs according a desired pattern, the delivery of power from the spindle motor 105 to the load can be regulated and controlled. Therefore, the DC-equivalent model may now include output regulation by driving the MOSFETs according to a drive algorithm as described further in FIG. 5.

Figure 5:
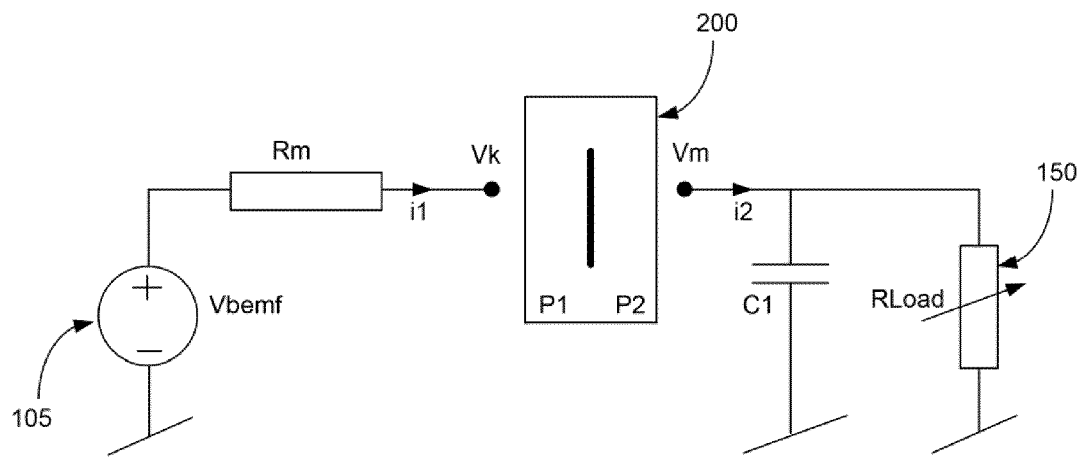
FIG. 5 is a schematic diagram of DC motor equivalent an embodiment of a HDD system having a spindle motor operating as an output-regulated electrical generator.

FIG. 5 is a schematic diagram of DC motor equivalent an embodiment of a HDD system having a spindle motor 105 operating as an output-regulated electrical generator. Again, the spindle motor 105 is represented as a voltage source Vbemf. However, in this DC-equivalent model, the voltage at the motor windings Vk and the voltage bus Vm are not the same point. As was discussed above, the PWM bridge 200 uncouples the voltage bus Vm from the voltage Vk at the motor windings. Therefore, the voltage at voltage bus Vm may rise and fall independent of the voltage Vk at the windings. The voltage bus Vm may be regulated by the PWM bridge 200 to yield a desired voltage above a threshold (i.e., controlled by the drive algorithm driving the PWM bridge). By applying differing PWM drive signals as discussed above, the phase voltage Vk may be set. Therefore, Vk may be controlled so as to deliver more or less power as needed. Generally speaking, in a first approximation, driving the PWM bridge 200 to yield a voltage Vk that is equivalent to one-half of Vbemf will generate the maximum power delivered to the external load 150. Likewise, driving the PWM bridge 200 to yield a voltage Vk that is just slightly less than Vbemf will generate will generate almost no power to the load 150.

In the DC-equivalent model of FIG. 5, i1 is the average DC equivalent current flowing through the motor windings. As such, given a voltage Vbemf of about 6.8 V due to back EMF when power is first lost, a resulting total apparent load is Vbemf/i1. The apparent load is a variable and is dependent upon the current that flows. If Vk is high (i.e., close to Vbemf), then little or no current will flow resulting in little or no power transfer. As Vk becomes lower, then the current becomes higher. Thus, the apparent power P1 generated by the spindle motor 105 at the primary side of the PWM bridge 200 that is available is P1=i1×Vk. Any external load (e.g., load 150) that may draw this power P1 may coupled through the PWM bridge 200 and receives the same amount of power through the PWM bridge 200 assuming no power loss in the PWM bridge. The power P2 delivered to the load is a product of the voltage Vm and the current i2. If one assumes a lossless PWM bridge 200 (any losses are negligible), then P1 is equal to P2. As before, Vm capacitor C1 also remains coupled between the voltage bus Vm and ground in parallel with the load 150 which reduces ripple on the voltage bus. Further, if the external load 150 is not dissipating all the power that is transferred by the PWM bridge 200, the excess energy will be stored on the capacitor C1 by raising the voltage on the voltage bus Vm. On the contrary if the external load 150 needs more energy, it will take energy from the capacitor C1 though lowering the voltage Vm.

By way of example, assume Vbemf is 4 V when the power-loss cycle starts. Further, assume that the load 150 needs to draw 0.4 amp for operation and that the voltage needs to be maintained above at least 5.0 V at the voltage bus Vm. The resultant power drawn at P2 is then 2.0 watts. Thus, the primary side P1 should also be 2.0 watts for optimum delivery of power. If the primary side power P1 is more, then mechanical energy may be wasted. If the primary side power P1 is less, then the voltage bus Vm will fall below the threshold. The current i1 will be (Vbemf−Vk)/Rm. If Rm is about 2 Ohms and Vbemf is about 4 V, then Vk should be driven at a voltage of 2.0 V to yield 2.0 watts of power P1. As Vbemf begins to fall or when Vm falls because the load 150 may be drawing more current, then Vk may be adjusted up or down to compensate for maintaining power delivery across the PWM bridge 200. This control and compensation is accomplished by monitoring the voltage at the voltage bus Vm (through the voltage comparator 109 (FIG. 2) to know when the voltage bus Vm is rising or falling. By monitoring the voltage bus Vm, the phase voltage Vk may be adjusted in an effort to regulate the voltage bus Vm.

The PWM bridge 200 may be driven such that each phase's pair of MOSFETs receives a series of pulses intended to turn these MOSFETs on and off in a pattern suited to provide the desired voltage Vk at the motor windings which results in a desired delivery of power to the voltage bus Vm (because the power transfer from P1 to P2 may be considered lossless). The series of pulses may be generated according to a specific drive algorithm from logic associated with power chipset 107 (FIG. 2). Such logic includes a voltage comparator 109 (FIG. 2) that may compare Vm to a threshold voltage such as 4.4 V. The output of the voltage comparator 109 adjusts the modulation of the PWM drive signal that drives each phase's pair of MOSFETs 110*a/b*, 120*a/b*, and 130*a/b*. Alternatively, the drive controller 108 may monitor the current flowing through the sense resistor 155 (FIG. 2) to control Vm, or may monitor both Vm and the current through the sense resistor 155.

By controlling the PWM drive signals to each phase's pair of MOSFETs according to a drive algorithm, the voltage at the voltage bus Vm may be regulated by controlling the voltage Vk. Generally speaking, drive algorithms may utilize the voltage comparator 109 (FIG. 2) to monitor the voltage at the voltage bus Vm and adjust the modulation of each PWM drive signal toward a higher or lower PWM modulation (generating a high or low sine wave pseudo-continuous voltage) based upon a comparison to a threshold voltage and the rotor position. That is, if the comparison shows Vm above the threshold, then the apparent load may be adjusted to be lower. This may be accomplished by driving the MOSFETs with a PWM drive signal with lower modulation (e.g., injecting a phase voltage with less sine amplitude) such as, for example the PWM drive signal 312 of FIG. 3B. Likewise, if the comparison shows Vm below the threshold, then the apparent load may be adjusted to be higher. This may be accomplished by driving the MOSFETs with a PWM drive signal with higher modulation (e.g., injecting a phase voltage with more sine amplitude) such as, for example the PWM drive signal 302 of FIG. 3A. The voltage comparator 109 (FIG. 2) may operate at least at a frequency suitable to overcome any effects due to the size of this capacitor C1. Furthermore, the Vm capacitor C1 is used as a buffer source of energy for the load 150.

Thus, in one embodiment, the power chip set 107 would switch the MOSFETs 110*a/b*, 120*a/b*, and 130*a/b* during a power-loss sequence so as to attempt to maximize the power delivered to the load 150; for example, this embodiment may be called the maximum-power embodiment. Further, the maximum electrical efficiency may be reached when RLoad is small or negligible (e.g., there are no power-loss sequence tasks being accomplished by the circuitry of the load 150); for example, this embodiment may be called a maximum-efficiency embodiment. Using a drive algorithm that drives the PWM bridge 200 between these two extremes and differently at different times results in an average voltage at the voltage bus Vm that may result in a more optimal delivery of power from the back EMFs to the load 150 over a longer period of time after a power loss.

These different drive algorithms may be used in order to more finely control the energy transfer according to the different applications of the HDD system. Some applications may be optimized to provide as much time as possible regardless of spikes in load current draw. Other applications may be suited to provide a voltage buffer at the voltage bus Vm so that when a read/write head is parked (resulting in a current spike), there is enough cushion to then compensate over time by backing away from a lighter apparent load (which is more efficient) toward a heavier apparent load (which produce more power). After the read/write head is parked, the algorithm may push the power delivered at the voltage bus Vm back toward efficiency with a lighter duty cycle as the current spike from parking the head is already accomplished. The relationships of the voltages Vk and Vm and drive signals described above with respect to FIG. 5 may be better understood with reference the graphs of FIG. 6.

Figure 6:
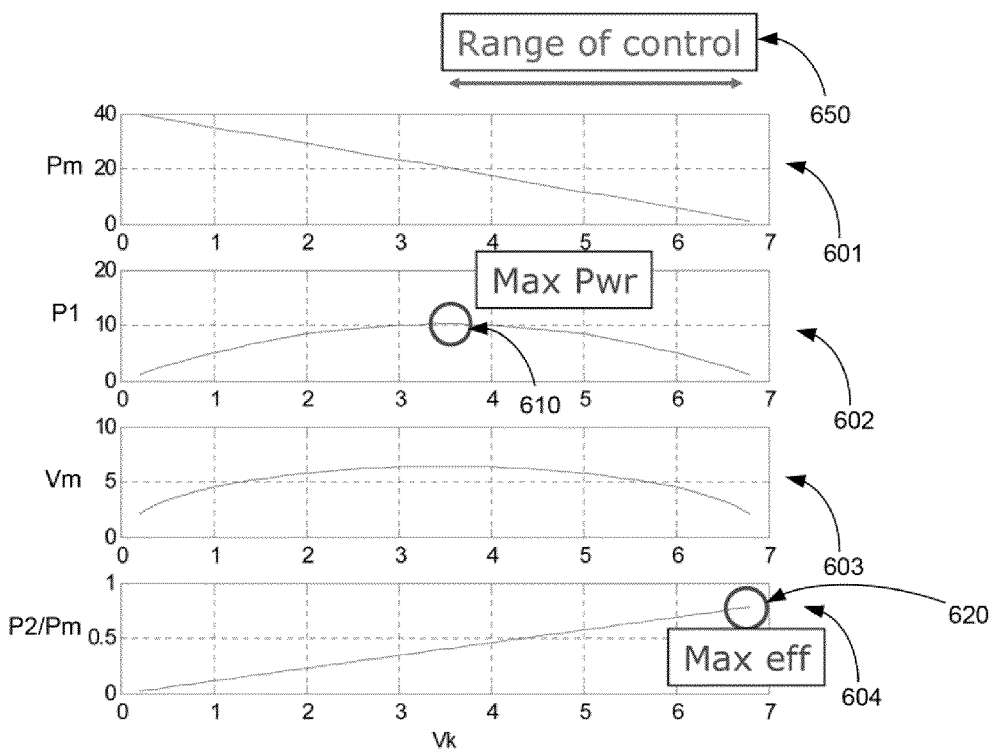
FIG. 6 is a set of plots that illustrate some principles of embodiments of the subject matter disclosed herein.

FIG. 6 is a set of plots 601-604 that help illustrate principles of various embodiments of the subject matter disclosed herein. These simplified plots are used to illustrate the difference between the extreme drive scenarios discussed above, i.e., maximum power delivery and maximum electrical efficiency. The first plot 601 shows a relationship between the voltage Vk at the motor windings and the mechanical power Pm extracted from the inertia. The second plot 602 shows a relationship between the voltage Vk and the electrical power P1 not dissipated across the motor windings but extracted out of the spindle motor. This electrical power P1 is the power converted into an electrical power P2 through the PWM bridge. P2 is the power that is dissipated at the load. The third plot 603 shows a relationship between the voltage Vk and the resulting voltage on the voltage bus Vm. Finally, the fourth plot 604 shows a relationship between the voltage Vk and the efficiency of the system defined as the ratio of power P2 dissipated at the load over the mechanical power Pm extracted from the spindle and converted into electrical energy. It has to be noted that in this example the load is a pure resistance.

In a first approximation, one can see that the maximum power is delivered at the point 610 in which the apparent load impedance RLoad is equal to the internal impedance Rm of the windings of the spindle motor 105. This point 610 represents the first extreme, which is delivering a maximum amount of power to the load. Likewise, maximum efficiency is reached at a point 620 when the load approaches zero. This point 620 represents the second extreme of delivering power to the load in the most efficient manner. Of course, if the load is zero and nothing is being powered then nothing is being accomplished. Thus, there exists a range of control 650 wherein a predetermined drive algorithm may be implemented by the controller 108 (FIG. 2) of the power chip set 107 (FIG. 2) There are several different drive algorithms that may accomplish a number of goals for an end user.

In a first drive algorithm, a default setting of delivering power at a maximum efficiency may be employed. This drive algorithm may be the second extreme (maximum efficiency) as discussed above. This drive algorithm employs a PWM drive signal having the lightest apparent load possible and includes a drive algorithm that simply turns on the MOSFETs. This is almost the same as synchronous rectification as discussed above.

An embodiment of a second drive algorithm automatically defaults to maximum power even though that power may not be needed initially. This embodiment represents the second extreme as discussed above. The embodiment drives the MOSFETs at a certain modulation of a PWM drive signal in an attempt to keep the voltage Vk at the motor windings close to half the Vbemf voltage. This may result in an unnecessary rising of the voltage at the voltage bus Vm and unnecessary quick slowing down of the spindle motor 105.

In an embodiment of a third drive algorithm, if the voltage on the voltage bus Vm is less than 4.4 V (or approaching he minimal safe operation voltage) then the PWM drive signals to the MOSFETs may be adjusted toward having Vk=Vbemf/2 (maximum power) to provide more power at the cost of slowing down the motor. That is, the PWM drive signals are adjusted to have more modulation resulting is a heavier apparent load. Similarly, if the voltage on the voltage bus Vm is greater than 4.4 V, then the PWM drive signals to the MOSFETs may be adjusted towards efficiency since the voltage at the voltage bus Vm is not in danger of going below 4.4 V. That is, the PWM drive signals are adjusted to have less modulation resulting in a lighter apparent load.

In an embodiment of a fourth drive algorithm, specific large current events, e.g., current spikes due to parking the read/write head, may be planned. Typical spikes of this nature are often present when the power chipset logic determines that it is time to park the read/write head. Thus, in a first phase, the PWM drive signal may be adjusted to have heavier apparent load such that the read/write head may be parked and the voltage bus Vm has enough of a voltage cushion to sustain the threshold voltage during the current spike due to the parking of the read/write head. Then, a drive algorithm may have PWM drive signals with a lighter apparent load during the second drive phase such that read and write tasks in a flash memory are accomplished.

In an embodiment of a fifth drive algorithm, the voltage at the voltage bus Vm may be regulated to be a certain amount above the threshold; for example, the voltage at the voltage bus Vm may be regulated to be maintained at a regulation threshold 5.0 V. Then, when power spikes may occur, there is enough of a voltage buffer to maintain the voltage above the operational threshold of 4.4 V.

In still further drive algorithms, specific known PWM drive patterns may be employed such that the monitoring of the voltage bus Vm may not be needed. Thus, if certain assumptions are made about the load of system, one may design an algorithm that starts at a first PWM drive signal having an apparent load characterized as lighter, and then slowly adjust the apparent load toward heavier uniformly over time or stepwise. In this manner, no regulation of the voltage bus occurs per se, but the voltage Vm should be maintained above the threshold if the changing nature of the current draw of the load is roughly known.

Figure 7:
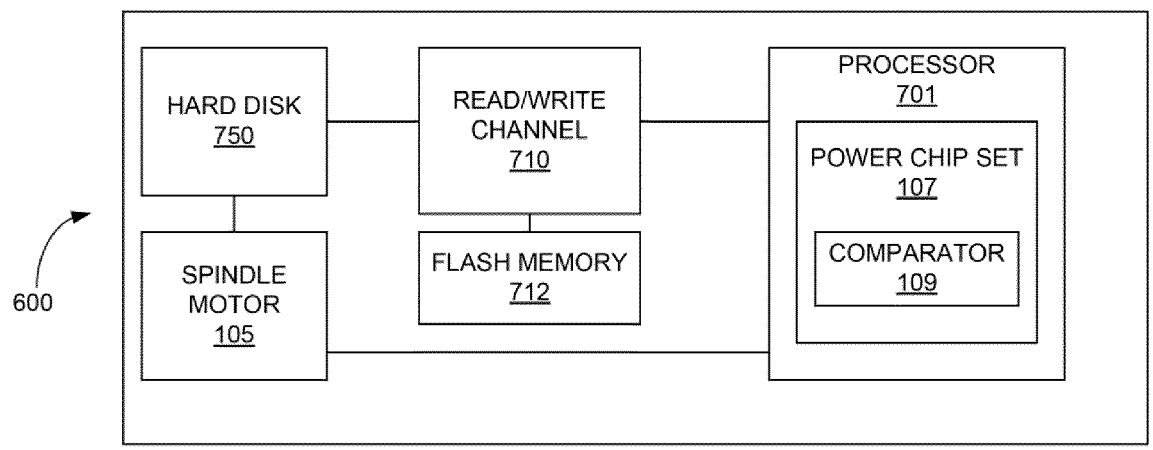
FIG. 7 is a block diagram of an embodiment of a computer system that may include embodiments as described in FIGS. 1-6.

FIG. 7 is a block diagram of a computer system 700 that may include embodiments as described in FIGS. 1-6. The computer system 700 may include a spindle motor 105 for actuating (e.g., spinning) one or more hard disks 750. The spindle motor 105 may be controlled by a processor 701 that includes a power chip set 107 as described above. Further, the processor may control a read/write channel 710 that may read data from or write data to the hard disk 750.

When a power loss is experienced, the power chip set 107 may include a voltage comparator 109 for monitoring a voltage on a voltage bus. In this manner, the controller may regulate the spindle motor 105 by driving the power chip set 107 to yield at least a threshold voltage at a voltage bus. As described above, numerous algorithms may be used to extract power out of the back EMF produced by the motor when power is lost, including a simple sequence of PWM values during certain time.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A circuit, comprising:
   a driver configured to be coupled to a rotating motor and configured to receive at least one phase voltage from the rotating motor and to generate a voltage on a supply node by coupling the phase voltage to the supply node in response to a pulse-width modulated signal;
   a voltage comparator configured to compare the voltage at the supply node to a threshold voltage; and
   a controller configured to generate the pulse-width modulated signal to adjust a switching characteristic of the driver based upon the comparison by the voltage comparator, the generated pulse-width modulated signal having a characteristic to change power delivered to the supply node.

2. The circuit of claim 1 wherein the circuit is disposed in a hard disk drive system.

3. The circuit of claim 1 wherein the threshold voltage comprises approximately 4.4 volts.

4. The circuit of claim 1 wherein the driver further comprises three pairs of MOSFET transistors, each pair configured to generate a voltage corresponding to one of three phase voltages of the motor.

5. The circuit of claim 1 wherein controller is further configured to:
   adjust the pulse-width modulated signal to have a higher modulation if the voltage at the supply node is above the threshold voltage; and
   adjust the pulse-width modulated signal to have a lower modulation if the voltage at the supply node is below the threshold voltage.

6. The circuit of claim 1 wherein the controller is further configured to:
   generate a first pulse-width modulated signal having a first switching characteristic during a first drive phase; and
   generate a second pulse-width modulated signal having a second switching characteristic during a second drive phase.

7. The circuit of claim 6 wherein the controller is further configured to:
    generate a parking control signal during the first phase; and
    generate a read/write instruction during the second phase.

8. The circuit of claim 1 further comprising an integrated circuit disposed on a single die.

9. A system, comprising:
    a motor configured to generate a back electromotive force at a first terminal;
    a load unrelated to the motor electrically coupled to the first terminal;
    a voltage comparator configured to compare the voltage at the first terminal to a threshold voltage; and
    a control circuit coupled to the motor configured to maintain power at the first terminal by switching the electrical coupling according to one of a plurality of power-loss switching algorithms.

10. The system of claim 9 wherein the control circuit comprises:
    a driver configured to switch the electrical coupling between the load and the first terminal; and
    a controller configured to adjust the switching based upon the comparison by the voltage comparator.

11. The system of claim 9, further comprising a flash memory for storing state information after a power loss.

12. The system of claim 9, further comprising:
    a hard disk coupled to a read/write channel; and
    a processor configured to control operations of the read/write channel and coupled to the control circuit such that the control circuit is controlled by the processor.

13. A method for maintaining a voltage level at a node during power loss, the method comprising:
    determining a voltage at a node when a power loss is detected, the voltage generated by a back electromotive force from a motor;
    comparing the voltage level to a threshold voltage; and
    regulating the voltage according to a pulse-width modulated drive algorithm to maintain power delivered to a load in response to the comparison, such that the drive algorithm that maximizes power delivered to a load coupled to the node, wherein the load is a load other than the motor.

14. The method of claim 13, further comprising regulating the voltage according to a drive algorithm that delivers a first level of power during a first phase and a second level of power during a second phase.

15. The method of claim 14, further comprising:
    causing the parking of a read/write head during the first phase; and
    causing the performing of write operations to a flash memory during the second phase.

16. The method of claim 13, further comprising regulating the voltage according to a drive algorithm that maintains power delivered to a load coupled to the node at a threshold that comprises a voltage buffer above the threshold voltage, wherein the load is a load other than the motor.

17. The method of claim 13, further comprising:
    if the compared voltage is above the voltage threshold, then incrementing the regulation toward a maximum efficiency drive algorithm; and
    if the compared voltage is below the voltage threshold, then incrementing the regulation toward a maximum power drive algorithm.

18. The method of claim 13, further comprising:
    detecting a power spike at the voltage bus; and
    in response, adjusting the drive algorithm to provide more power to the voltage bus.

19. The method of claim 13, further comprising:
    detecting an excess voltage at the voltage bus; and
    in response, adjusting the drive algorithm to provide less power to the voltage bus.

20. A circuit, comprising:
    a driver configured to be coupled to a rotating motor and configured to receive at least one phase voltage from the rotating motor and to generate a voltage on a supply node by coupling the phase voltage to the supply node in response to a pulse-width modulated signal;
    a voltage comparator configured to compare the voltage at the supply node to a threshold voltage; and
    a controller configured to generate the pulse-width modulated signal to adjust a switching characteristic of the driver based upon the comparison by the voltage comparator, the generated pulse-width modulated signal having a characteristic to affect power efficiency delivered to the supply node.

* * * * *